Aug. 24, 1943. W. J. McCARTNEY 2,327,604
COUPLING
Filed Nov. 4, 1940
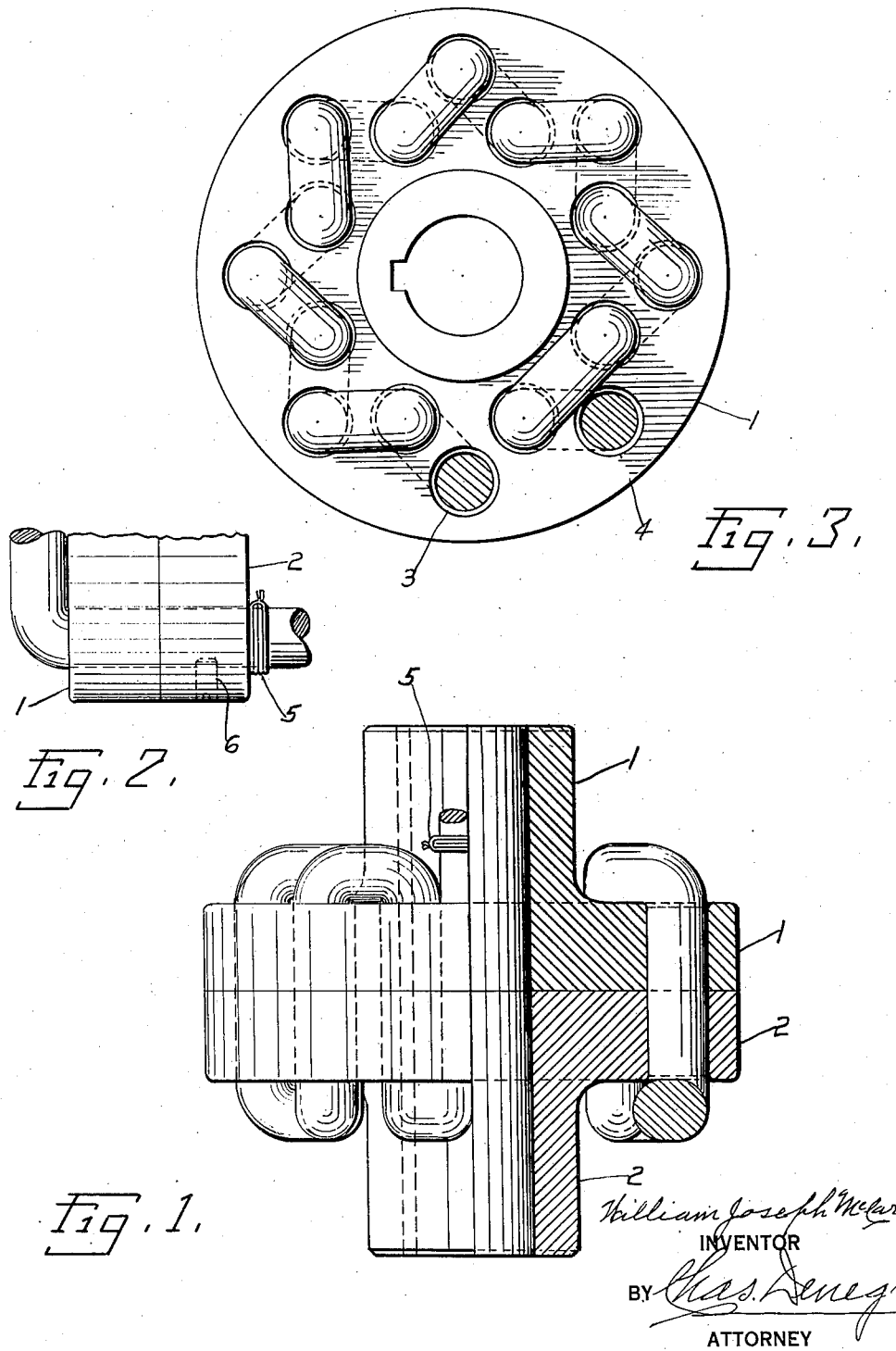

Patented Aug. 24, 1943

2,327,604

UNITED STATES PATENT OFFICE 2,327,604

COUPLING

William Joseph McCartney, Birmingham, Ala.

Application November 4, 1940, Serial No. 364,263

4 Claims. (Cl. 64—12)

This invention relates to couplings for connecting line shafts, or for use on any shaft where a coupling is necessary. The main object of the invention is to provide a coupling that possesses the qualities of being quiet in operation, of long life, cheap to manufacture, and easy to repair and keep in running condition. Other advantages will appear in the drawing and description.

By referring to the drawing, part of this application, it will be observed that Fig. 1 is a side view of the assembled coupling partly cut away; Fig. 2 is a view of a fragment of the coupling showing how the lacing member is held in place at its ends; Fig. 3 is an end view of the assembled coupling partly cut away.

Similar reference numerals refer to similar parts throughout the several views.

Again referring to the drawing it will be seen that the coupling is made in two identical disks 1 and 2 with hub extension on each. Each disk is provided with a plurality of holes uniformly placed that register through both disks when the disks are placed face to face and in alignment. Laced through the holes is a flexible round member, preferably made of rubber, that holds the disks together and transfers the torque from the driving disk to the driven disk. The ends of the flexible member indicated by 3 and 4 extend beyond the surface of the disk so as to be held in place by means of twisted wire clamp as shown by 5 or set screw indicated by 6.

The operation of the coupling is along standard methods consisting in mounting one disk on the end of one shaft and mounting the other disk on the end of the opposite shaft to be joined. The shafts ends are flush with the inner faces of the two disks. Then the lacing is passed through all the registering holes in the disks with the two ends of the lacing member held in place to prevent pulling out, by set screw means or by wire clamp means. The lacing member carries all the torque of the coupling, and being flexible absorbs the shock, thus tending to reduce noise, and crystallization of the shaft and other metal parts.

The right is reserved to manufacture the coupling out of any material best suited for the purpose, but rubber is preferred for the flexible member, and iron, steel or metal for the disks.

While I have shown the preferred embodiment of my invention I do not wish to limit myself to the precise and exact details of structure but reserve the right to make any and all modifications and changes so long as I remain within the spirit and scope of the following claims:

I claim:

1. A coupling for power line shafts comprising two disks with hub extension on each, a plurality of holes through the face of each disk in uniform position, the holes in one disk registering with the holes in the other disk when both disks are aligned and placed face to face; a rubber member of a size to pass through said holes and fit therein, and thereby hold said disks together face to face, the two free ends of said rubber member retained by set screw means.

2. A coupling for transmitting torque from one shaft to another comprising; two disks with integral hub on each, a shaft hole through each hub and disk, a plurality of holes uniformly placed in said disks, said holes being parallel with the shaft hole, the holes in one disk registering with the holes in the other disk when said disks are placed face to face; a one piece flexible member laced through all of said disks holes to transfer torque from one disk to the other, the ends of said flexible member held in place by set screw means.

3. A shaft coupling comprising; two disks with a hub integral on one side of each disk, a shaft hole through each hub and disk, a plurality of holes uniformly placed in said disks and parallel with said shaft holes, a one piece flexible member laced through said holes from outer face to outer face to transfer torque from one disk to the other disk, the loose ends of said flexible member held in place by set screw means.

4. A power transmitting shaft coupling comprising; two disks with integral hub for shaft on one side of each disk, a plurality of uniformly and zig-zagly placed holes in said disks disposed to register the holes in one disk with the holes in the other disk when both disks are in alignment and face to face; a one piece flexible member laced through all said holes with said disks face to face, the loose ends of said flexible member held in place by set screw means.

WILLIAM JOSEPH McCARTNEY.